United States Patent
Ou et al.

(10) Patent No.: US 12,250,455 B2
(45) Date of Patent: Mar. 11, 2025

(54) DUAL PURPOSE CAMERA AND IMAGE ADJUSTING METHOD FOR DIFFERENT CAMERA MODES USING THE SAME

(71) Applicant: Qisda Corporation, Taoyuan (TW)

(72) Inventors: Chia-Hsin Ou, Taoyuan (TW); Wen-Ming Wu, Taoyuan (TW); Yu-Shuo Fan, Taoyuan (TW); Shu-Fen Ke, Taoyuan (TW); Yu-Chia Chen, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 182 days.

(21) Appl. No.: 18/096,060

(22) Filed: Jan. 12, 2023

(65) Prior Publication Data

US 2023/0345120 A1    Oct. 26, 2023

(30) Foreign Application Priority Data

Apr. 25, 2022   (CN) .......................... 202210441513.0

(51) Int. Cl.
*H04N 23/667*   (2023.01)
*H04N 23/50*    (2023.01)
*H04N 23/695*   (2023.01)

(52) U.S. Cl.
CPC .......... *H04N 23/667* (2023.01); *H04N 23/50* (2023.01); *H04N 23/695* (2023.01)

(58) Field of Classification Search
CPC ........ H04N 23/50; H04N 23/51; H04N 23/58; H04N 23/63; H04N 23/667; H04N 23/695
See application file for complete search history.

(56) References Cited

U.S. PATENT DOCUMENTS

| | | | | |
|---|---|---|---|---|
| 5,374,971 A | * | 12/1994 | Clapp | F16M 11/10 |
| | | | | 396/428 |
| 2004/0012701 A1 | * | 1/2004 | Nagai | G06F 1/1616 |
| | | | | 348/333.12 |
| 2009/0095871 A1 | * | 4/2009 | Xiao | G06F 1/1607 |
| | | | | 248/442.2 |
| 2012/0001999 A1 | * | 1/2012 | Schirdewahn | H04N 7/142 |
| | | | | 348/E7.083 |
| 2015/0049237 A1 | * | 2/2015 | Ujiie | H04N 7/142 |
| | | | | 348/333.13 |
| 2021/0001999 A1 | | 1/2021 | Massa | |

FOREIGN PATENT DOCUMENTS

| | | |
|---|---|---|
| CN | 101140412 B | 1/2011 |
| TW | 200917005 A | 4/2009 |
| TW | M613038 U | 6/2021 |

OTHER PUBLICATIONS

Office action of counterpart application by Taiwan IP Office on May 22, 2023.

* cited by examiner

*Primary Examiner* — Lin Ye
*Assistant Examiner* — Chriss S Yoder, III

(57) ABSTRACT

A dual purpose camera is provided. The dual purpose camera has a doccam mode and a webcam mode. The dual purpose camera includes a base, a supporting member, and a camera. The supporting member is detachably or rotatably coupled to the base. The camera is rotatably or detachably coupled to the supporting member. The camera rotates with respect to a reference plane of the dual purpose camera between a first position and a second position. When it is detected that the camera is attached to the base and the camera rotates from the first position to the second position, the camera automatically outputs a 180 degree rotated image.

15 Claims, 12 Drawing Sheets

DUAL PURPOSE CAMERA AND IMAGE ADJUSTING METHOD FOR DIFFERENT CAMERA MODES USING THE SAME

This application claims the benefit of People's Republic of China application Serial No. 202210441513.0, filed Apr. 25, 2022, the disclosure of which is incorporated by reference herein in its entirety.

TECHNICAL FIELD

The disclosure relates in general to a dual purpose camera, and more particularly to a dual purpose camera, which can be used as a doccam and a webcam, and a camera mode image adjustment method using the dual purpose camera.

BACKGROUND

During the raging period of the epidemic, many people's work mode has changed to working from home and remote conference. During a video conference, the user may need to use documents on the desk or other objects when making a presentation or explanation. It would be of great convenience to the user if the webcam for video conference and the doccam for capturing the image of real object can be integrated.

SUMMARY

The present disclosure is directed to a dual purpose camera, which can be used as a doccam and a webcam, and a camera mode image adjustment method using the dual purpose camera.

The dual purpose camera according to an embodiment has a doccam mode and a webcam mode. The dual purpose camera includes a base, a supporting member, and a camera. The supporting member is detachably or rotatably coupled to the base. The camera is rotatably or detachably coupled to the supporting member. The camera rotates with respect to a reference plane of the dual purpose camera between a first position and a second position. When it is detected that the camera is attached to the base and the camera rotates from the first position to the second position, the camera automatically outputs a 180 degree rotated image.

The camera mode image adjustment method according to an embodiment is used in a dual purpose camera. The camera mode image adjustment method includes: detecting whether a camera of a dual purpose camera is attached to a base; detecting whether the camera rotates from a first position to a second position; and automatically outputting a 180 degree rotated image by the camera when it is detected that the camera is attached to the base and the camera rotates from the first position to the second position.

The above and other aspects of the disclosure will become better understood with regard to the following detailed description of the preferred but non-limiting embodiment(s). The following description is made with reference to the accompanying drawings.

DETAILED DESCRIPTION

Figure 1A:
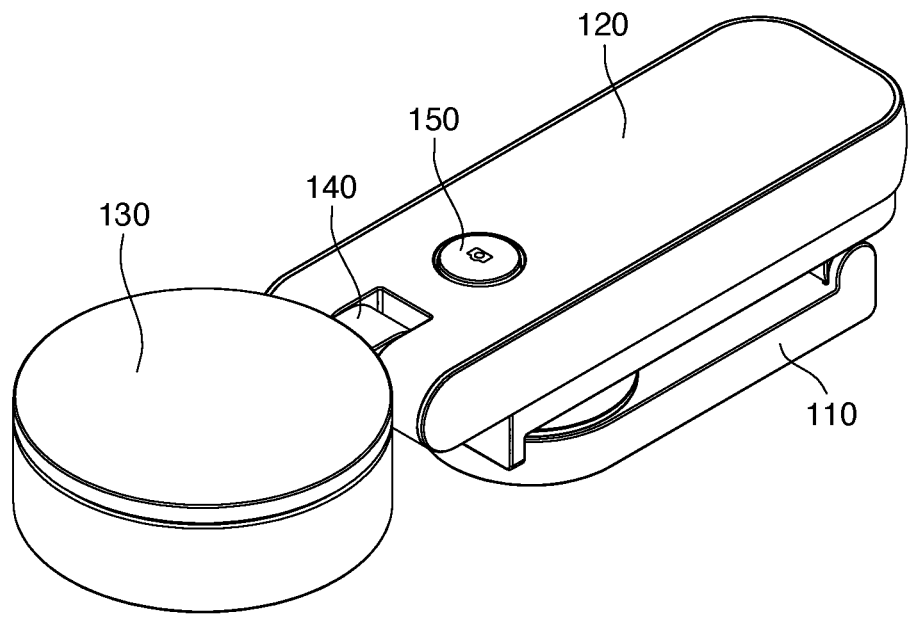
FIG. 1A to FIG. 1F are schematic diagrams of a dual purpose camera according to an embodiment.

Detailed descriptions of various embodiments of the disclosure are made with reference to accompanying drawings. For the drawings to be better understood, sizes and scales of the elements are schematically shown in the drawings. Besides, a part of elements and/or symbols may be omitted in some accompanying drawings. The following descriptions and accompanying drawings are for explanatory and exemplary purposes only, not for limiting the scope of protection of the present disclosure. It can be expected that the elements and features of one embodiment can be advantageously included in another embodiment without additional explanations.

Figure 1B:
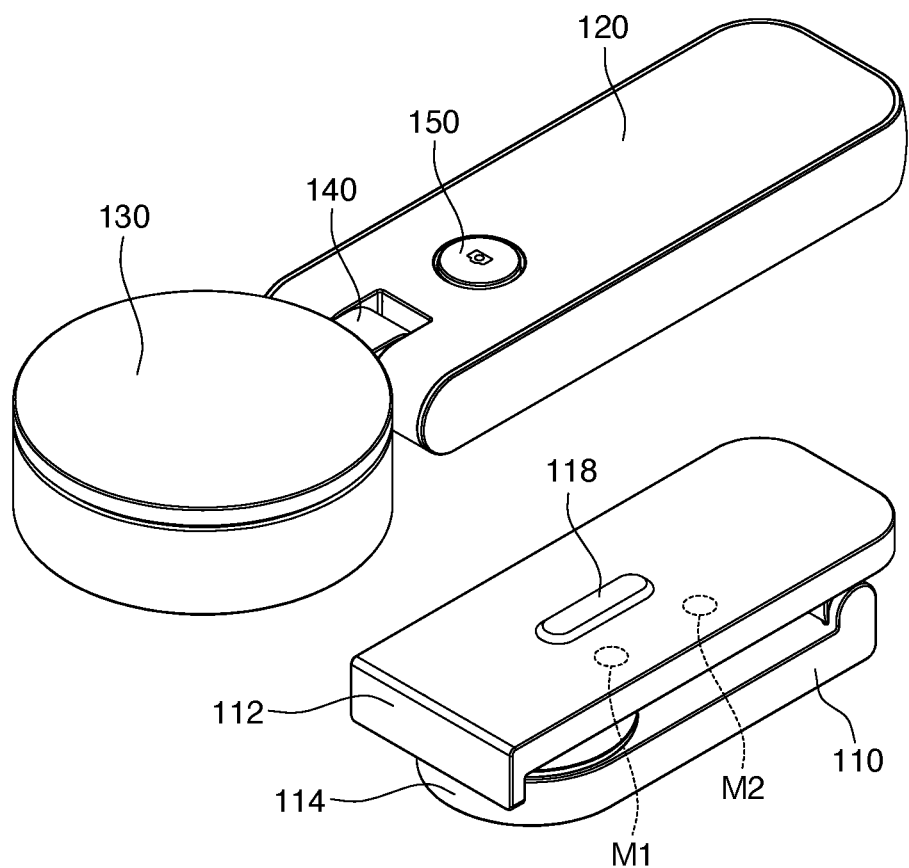
Figure 1C:
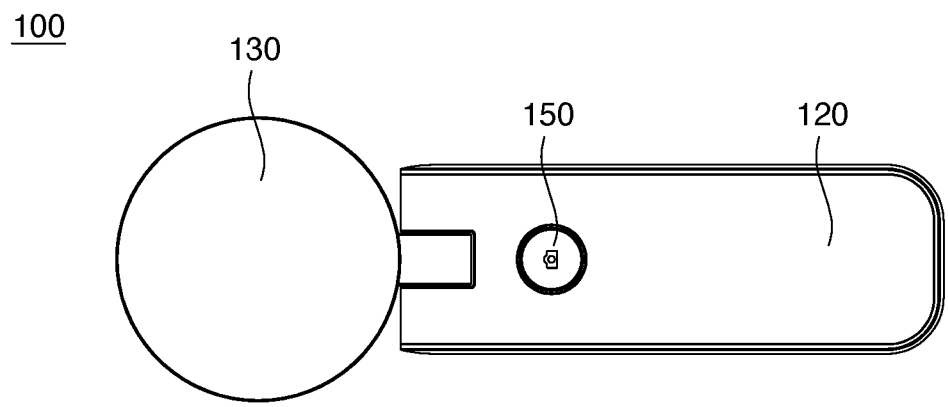
Figure 1D:
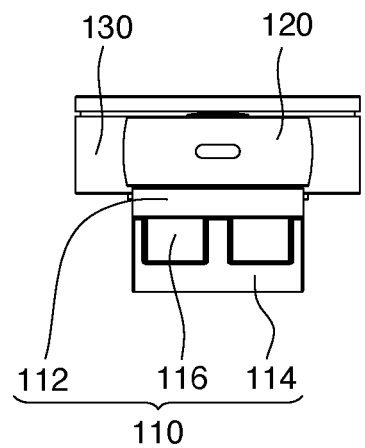
Figure 1E:
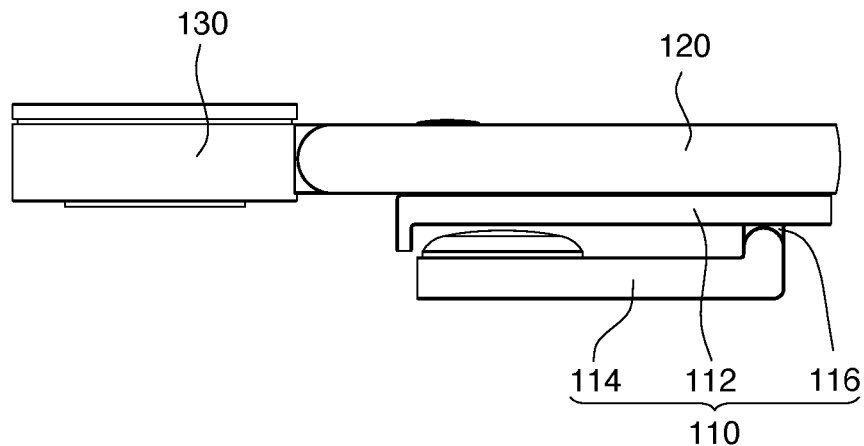
Figure 1F:
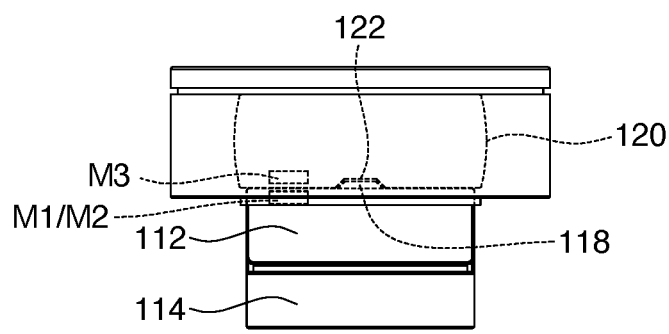

FIG. 1A to FIG. 1F are schematic diagrams of a dual purpose camera 100 according to an embodiment. FIG. 1A is a 3D schematic diagram of a dual purpose camera 100. FIG. 1B is a 3D schematic diagram of the dual purpose camera 100 when a supporting member and a base are separated from each other. FIG. 1C is a top view of the dual purpose camera 100. FIG. 1D is a rear view of the dual purpose camera 100. FIG. 1E is a side view of the dual purpose camera 100. FIG. 1F is a front view of the dual purpose camera 100.

Figure 2A:
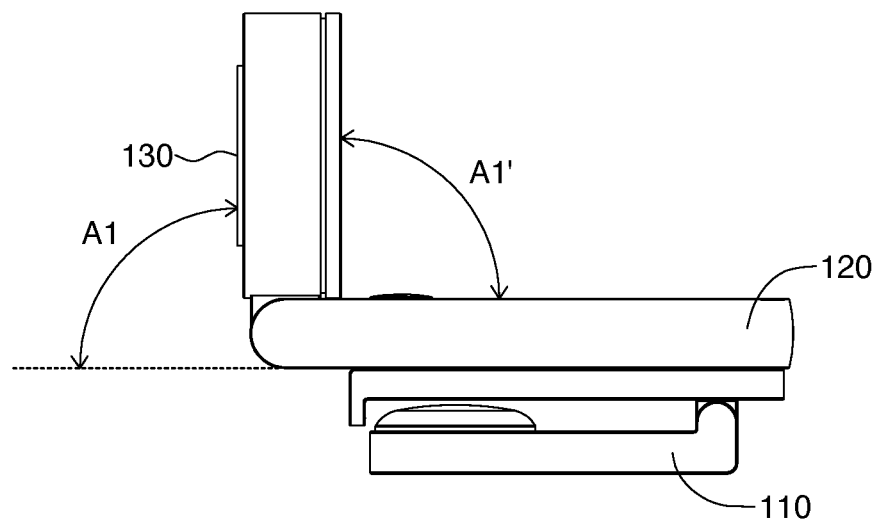
FIGS. 2A to 2B are schematic diagrams of a camera of a dual purpose camera at a first position and a second position according to an embodiment.
Figure 2B:
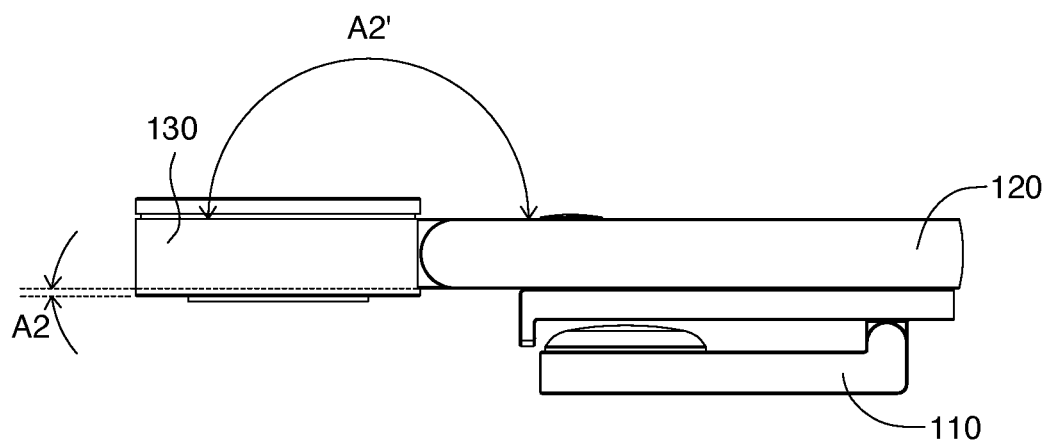

The dual purpose camera 100 has a doccam mode and a webcam mode. The dual purpose camera 100 includes a base 110, a supporting member 120, and a camera 130. The supporting member 120 can be detachably coupled to the base 110. The camera 130 is rotatably pivoted to the supporting member 120. The camera 130 can rotate with respect to a reference plane of the dual purpose camera 100 between a first position (as indicated in FIG. 2A) and a second position (as indicated in FIG. 2B). When it is detected that the camera 130 is attached to the base 110 and the camera 130 rotates from the first position to the second position, the camera 130 automatically outputs a 180 degree rotated image.

In terms of the external structure of the dual purpose camera 100, according to some embodiments, the base 110 may include a body 112, a counterweight member 114, and a hinge 116. The supporting member 120 is attached to the body 112. The counterweight member 114 is rotatably pivoted to the body 112. The hinge 116 is configured to connect the counterweight member 114 and the body 112. The dual purpose camera 100 can be fixed to an object with the body 112 being placed above the object and the counterweight member 114 leaning on the rear side of the object (as shown in FIG. 1E).

According to some embodiments, the supporting member 120 may have a groove 122, and the body 112 may have a protrusion 118 inserted into the groove 122, so that the supporting member 120 can slide on the base 110 and extend from the base 110. Thus, the supporting member 120 can slide on the base 110 along an extending direction of the supporting member 120 and extend from the base 110. Thus, the camera 130 can be closer to the to-be-shot object and the deformation caused by the perspective angle can be reduced.

The sliding of the supporting member 120 is limited by the groove 122 and the protrusion 118. Moreover, the span of extension of the supporting member 120 can be determined according to the lengths of the groove 122 and the protrusion 118. In some embodiments, the maximum span of extension can be up to 25 mm.

According to some embodiments, the body 112 may have at least one magnet, which attracts the supporting member 120 by a magnetic force. Thus, the supporting member 120 can be detachably coupled to the base 110. For example, the body 112 may have two magnets M1 and M2 disposed on the positions corresponding to two ends of the protrusion 118. Correspondingly, the supporting member 120 may have a magnet M3. When the supporting member 120 does not extend with respect to the base 110, the magnet M3 is attached to the magnet M2 to fix the supporting member 120 to the base 110. When the supporting member 120 extends with respect to the base 110 to the maximum amount, the magnet M3 is attached to magnet M1 to fix the supporting member 120 to the base 110. However, the arrangement of the present disclosure is not limited to the above exemplification. According to some other embodiments, the body 112 and the supporting member 120 can also be attached electrically to each other. The supporting member 120 and the base 110 are detachably coupled to each other, so that the shooting angle can be more flexible. For example, the user can detach the supporting member 120 from the base 110 and holds the camera 130 at hand when shooting an object.

According to some embodiments, the dual purpose camera 100 may further include a hinge 140 configured to connect the camera 130 and the supporting member 120. Thus, the camera 130 can be rotatably pivoted to the supporting member 120. Furthermore, the camera 130 can rotate with respect to the reference plane of the dual purpose camera 100 between a first position and a second position. As indicated in FIGS. 2A to 2B, the reference plane of the dual purpose camera 100 is the top surface of the supporting member 120. FIG. 2A is a schematic diagram of a camera 130 at a first position. FIG. 2B is a schematic diagram of a camera 130 at a second position. According to some embodiments, at the first position, the angle between the surface of the camera 130 on which the camera module 132 is disposed and the reference plane is greater than 50 degree. At the second position, the angle between the surface of the camera 130 on which the camera module 132 is disposed and the reference plane is less than 50 degree. On the other hand, at the first position, the angle A1' between the camera 130 and the supporting member 120 can be about 90 degree to about 130 degree. At the second position, the angle A2' between the camera 130 and the supporting member 120 can be about 130 degree to about 180 degree.

Figure 3:
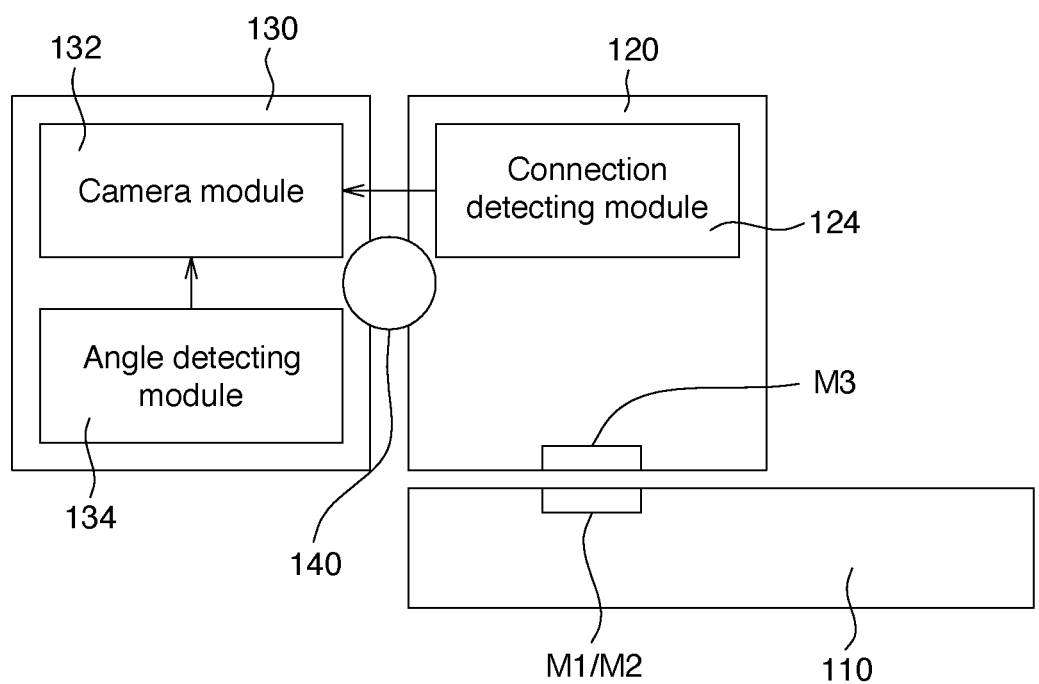
FIG. 3 is a schematic diagram of possible modules of a dual purpose camera according to an embodiment.

Referring to FIG. 3, a schematic diagram of internal modules of the dual purpose camera 100 is shown. The camera 130 may include a camera module 132 and an angle detecting module 134. The supporting member 120 may include a connection detecting module 124. The camera module 132 is configured to capture an image, determine whether the dual purpose camera 100 is in the doccam mode or the webcam mode, and output the image. The angle detecting module 134 communicates with the camera module 132 and determines the angle between the camera 130 and the reference plane. The connection detecting module 124 communicates with the camera module 132 and determines whether the camera 130 is attached to the base 110. Here, the camera 130 is attached to the base 110 through the supporting member 120. According to some embodiments, the camera module 132 determines whether the dual purpose camera 100 is in the doccam mode or the webcam mode according to the detection results provided by the connection detecting module 124 and the angle detecting module 134. When the detection result provided by the connection detecting module 124 indicates that the camera 130 is attached to the base 110 and the detection result provided by the angle detecting module 134 indicates that the camera 130 is at the first position, the camera module 132 determines that the dual purpose camera 100 is in the webcam mode. When the detection result provided by the connection detecting module 124 indicates that the camera 130 is attached to the base 110 and the detection result provided by the angle detecting module 134 indicates that the camera 130 is at the second position, the camera module 132 determines that the dual purpose camera 100 is in the doccam mode. According to some embodiments, when the camera module 132 determines that the dual purpose camera 100 switches from the webcam mode to the doccam mode or switches from the doccam mode to the webcam mode, the camera module 132 automatically outputs a 180 degree rotated image. Here, there is no need to perform complicated image analysis or operations. Based on mechanical situations (whether the camera 130 is attached to the base 110 and the angle of the camera 130), the dual purpose camera 100 can determine whether the webcam mode and the doccam mode have been switched. It the webcam mode and the doccam mode have been switched, the dual purpose camera 100 automatically rotates the image and outputs the rotated image. According to some embodiments, if the detection result provided by the connection detecting module 124 indicates that the camera 130 is not attached to the base 110, regardless of the detection result provided by the angle detecting module 134, the camera module 132 will not automatically rotate the image. In some embodiments, the angle detecting module 134 can be a G-sensor or a tilt-sensor, but the present disclosure is not limited thereto. In some embodiments, the connection detecting module 124 can be a magnetism detection module or an electrical property detection module, but the present disclosure is not limited thereto.

Refer to FIG. 1A to FIG. 1F again. According to some embodiments, the dual purpose camera 100 may further include a controller 150 configured to control the camera 130. What can be controlled through the controller 150 includes but is not limited to the zooming of image and screenshot. The controller 150 can be integrated on the supporting member 120, but the present disclosure is not limited thereto.

Figure 4A:
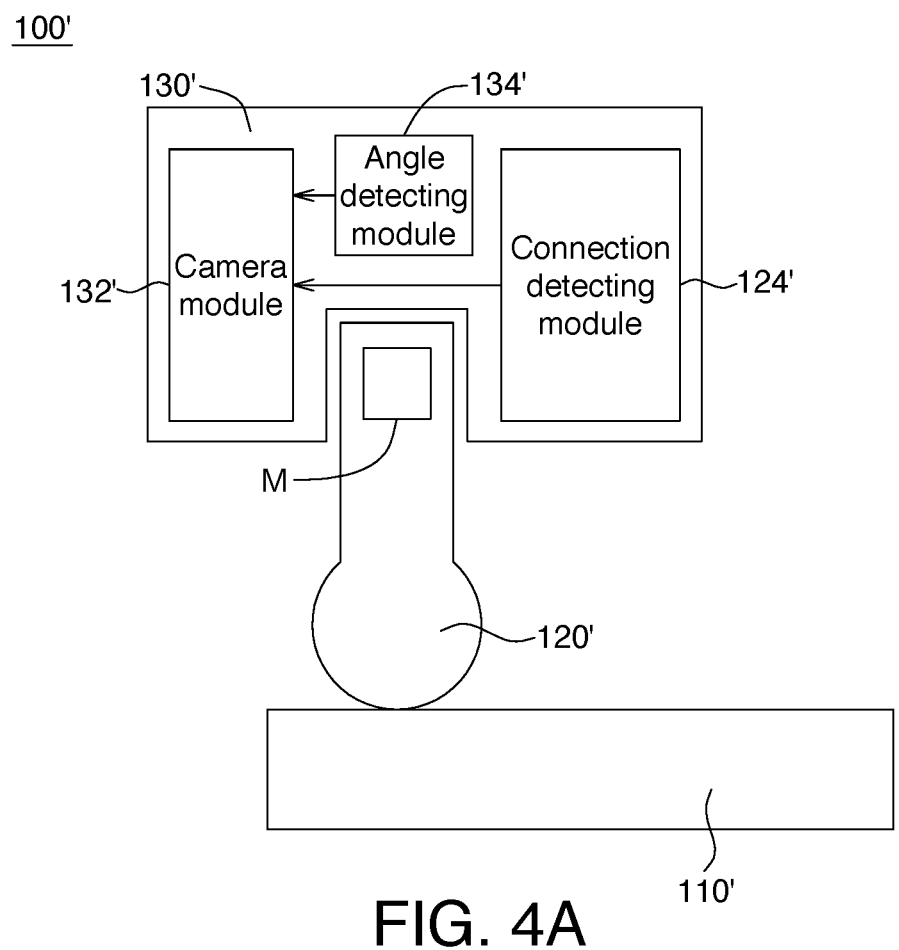
FIGS. 4A to 4B are schematic diagrams of another dual purpose camera according to an embodiment.
Figure 4B:
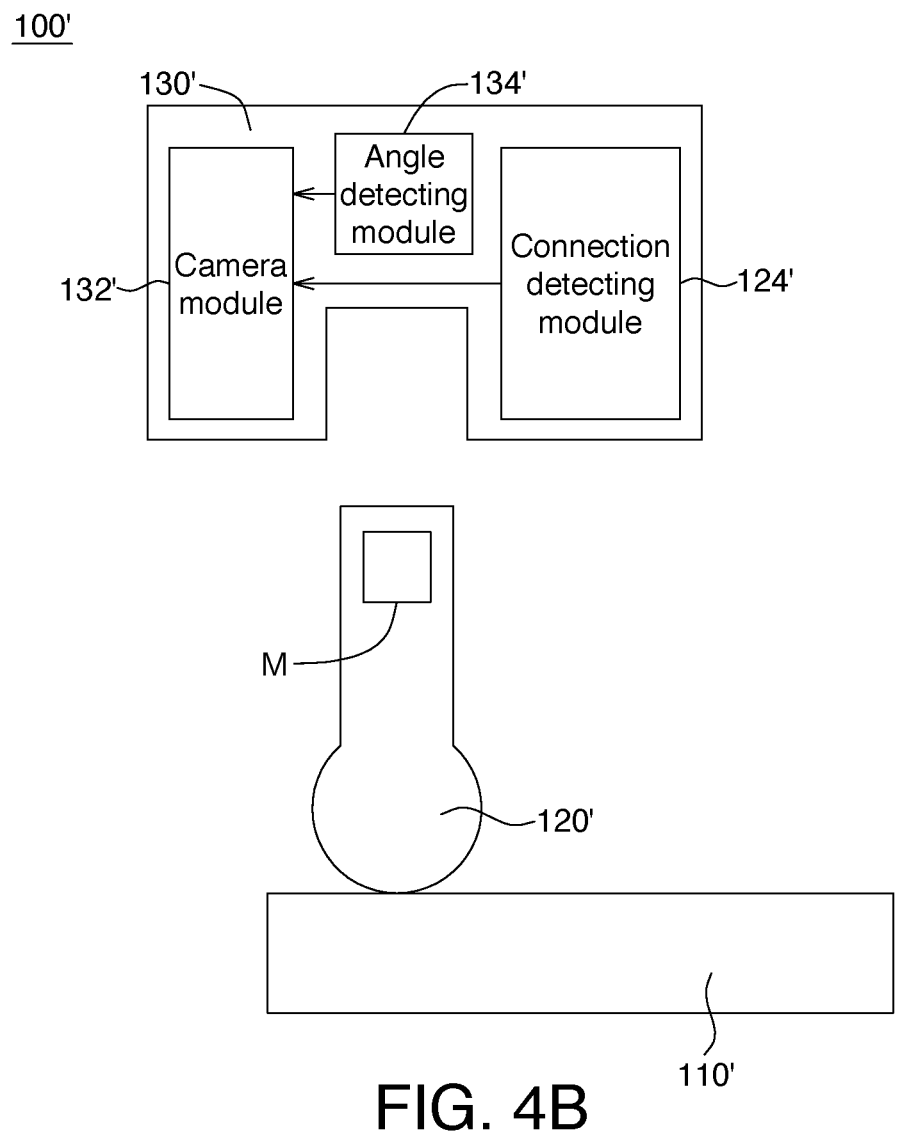

FIGS. 4A to 4B are schematic diagrams of another dual purpose camera 100' according to an embodiment. Similar elements between the dual purpose camera 100' and the dual purpose camera 100 can adopt similar symbols.

The dual purpose camera 100' includes a base 110', a supporting member 120', and a camera 130'. The supporting member 120' can be rotatably coupled to the base 110'. The camera 130' can be detachably coupled to the supporting member 120'. The camera 130' rotates with respect to a reference plane of the dual purpose camera 100' between a first position and a second position. The reference plane of the dual purpose camera 100' is the top surface of the base 110'. When it is detected that the camera 130' is attached to the base 110' and the camera 130' rotates from the first position to the second position, the camera 130' automatically outputs a 180 degree rotated image.

In terms of the internal modules of the dual purpose camera 100', primary part of the connection detecting module is not disposed in the supporting member 120'. The primary part of the connection detecting module is disposed in the camera 130' instead. That is, the camera 130' further includes a connection detecting module 124' in addition to a camera module 132' and an angle detecting module 134'. In some embodiments, secondary part of the connection detecting module 124' can be disposed in the supporting member 120'.

In terms of the external structure of the dual purpose camera 100', since primary part of the connection detecting module is not disposed in the supporting member 120', the supporting member 120' can be greatly simplified in comparison to the supporting member 120. The supporting member 120' can be directly fixed on the base 110'. The camera 130' can be detachably coupled to the supporting member 120'. For example, the supporting member 120' may have at least one magnet M, which attracts the camera 130' with a magnetic force, but the present disclosure is not limited thereto.

When it is detected that the camera 130' is attached to the base 110' and rotates from the first position to the second position, the camera 130' automatically outputs a 180 degree rotated image. In practical implementation, the way by which the connection detecting module 124' detects whether the camera 130' is attached to the base 110' depends on actual situation, and is not limited to the above exemplification.

Figure 5A:
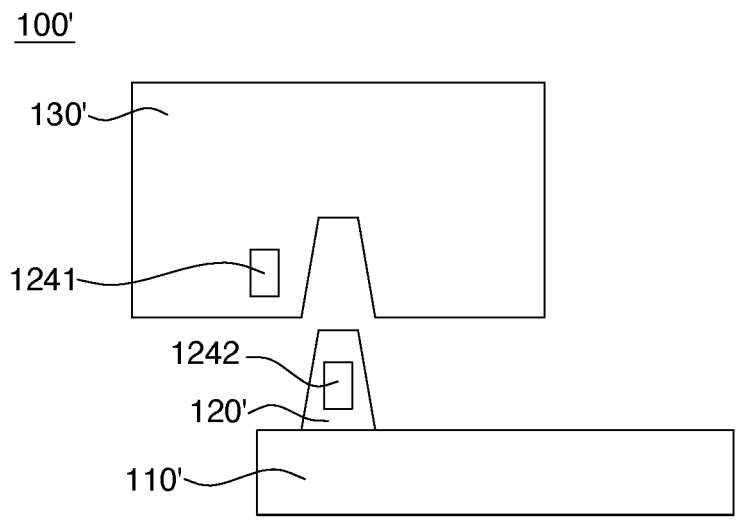
FIGS. 5A to 5C are schematic diagrams of a connection detecting module of a dual purpose camera according to an embodiment.

Refer to FIG. 5A. In some embodiments, the camera 130' and the supporting member 120' can be coupled to each other by a magnetic force. The connection detecting module 124' includes a Hall sensor 1241 and a magnet 1242. The Hall sensor 1241 is disposed on the camera 130', and the magnet 1242 is disposed on the supporting member 120'. The magnet 1242 can be realized by a plug magnet. When the supporting member 120' is connected to the camera 130', the connection detecting module 124' senses a magnetic force of the magnet 1242 of the supporting member 120' through the Hall sensor 1241 and determines that the supporting member 120' is attached to the base 110'. More specifically, when the plug of the supporting member 120' is inserted into the camera 130', the Hall sensor 1241 of the camera 130' senses the magnetic force of the plug magnet 1242 of the supporting member 120'. That is, the connection detecting module 124' detects that the camera 130' is attached to the base 110'. Then, when the angle detecting module 134' senses the angle between the surface of the camera 130' on which the camera module 132' is disposed and the reference plane is 0 degree to 50 degree, the camera 130' automatically outputs a 180 degree rotated image.

Figure 5B:
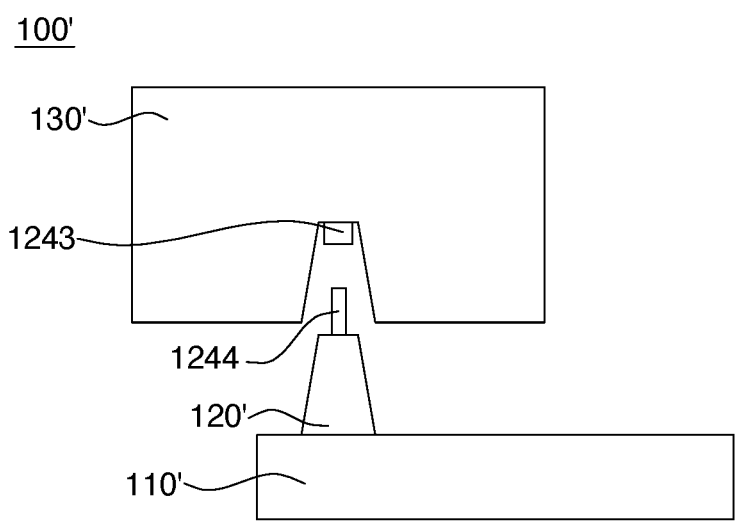

Refer to FIG. 5B. In some other embodiments, the camera 130' and the supporting member 120' can be triggered through displacement, and the direction can be calculated according to the amount of displacement. The connection detecting module 124' includes a micro switch 1243 and a trigger 1244. The micro switch 1243 is disposed on the camera 130', and the trigger 1244 is disposed on the supporting member 120'. When the supporting member 120' is connected to the camera 130' and the trigger 1244 of the supporting member 120' contacts the micro switch 1243 of the camera 130' to turn on the micro switch 1243, the connection detecting module 124' determines that the supporting member 120' is attached to the base 110'. More specifically, when the plug of the supporting member 120' is inserted into the camera 130', the trigger 1244 of the supporting member 120' contacts the micro switch 1243 of the camera 130' to turn on the micro switch 1243. That is, after the connection detecting module 124' detects that the camera 130' is attached to the base 110'. Then, when the angle detecting module 134' senses the angle between the surface of the camera 130' on which the camera module 132' is disposed and the reference plane is 0 degree to 50 degree, the camera 130' automatically outputs a 180 degree rotated image.

Figure 5C:
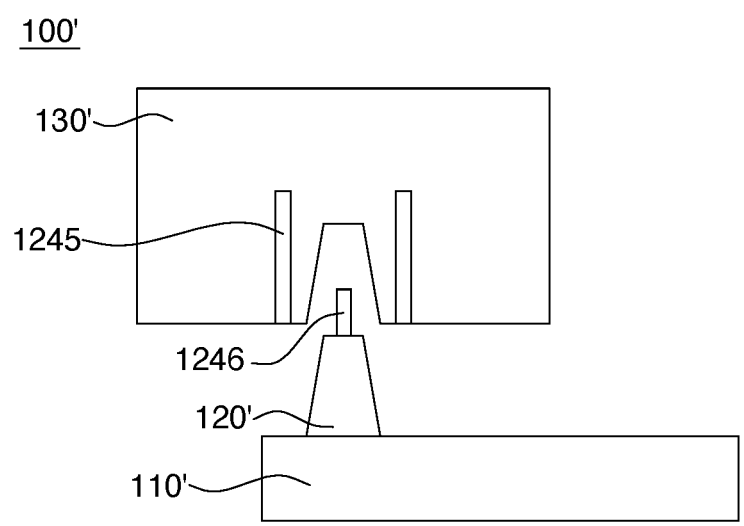

Refer to FIG. 5C. In some other embodiments, whether the camera 130' and the supporting member 120' are connected can be determined through optical detection. The connection detecting module 124' includes an infrared sensing element 1245 and a blocking portion 1246. The infrared sensing component 1245 is disposed on the camera 130', and the blocking portion 1246 is disposed on the supporting member 120'. When the supporting member 120' is connected to the camera 130' and the infrared light of the infrared sensing element 1245 of the camera 130' is shielded by the blocking portion 1246 of the supporting member 120', the connection detecting module 124' determines that the supporting member 120' is attached to the base 110'. More specifically, when the plug of the supporting member 120' is inserted into the camera 130' (that is, the supporting member 120' and the camera 130' are connected through insertion), the blocking portion 1246 of the supporting member 120' shields the infrared light of the infrared sensing element 1245, that is, the connection detecting module 124' detects that the camera 130' is attached to the base 110'. Then, when the angle detecting module 134' senses the angle between the surface of the camera 130' on which the camera module 132' is disposed and the reference plane is 0 degree to 50 degree, the camera 130' automatically outputs a 180 degree rotated image.

Other features of the dual purpose camera 100' are similar to the features of the dual purpose camera 100, and the similarities are not repeated here.

Figure 6A:
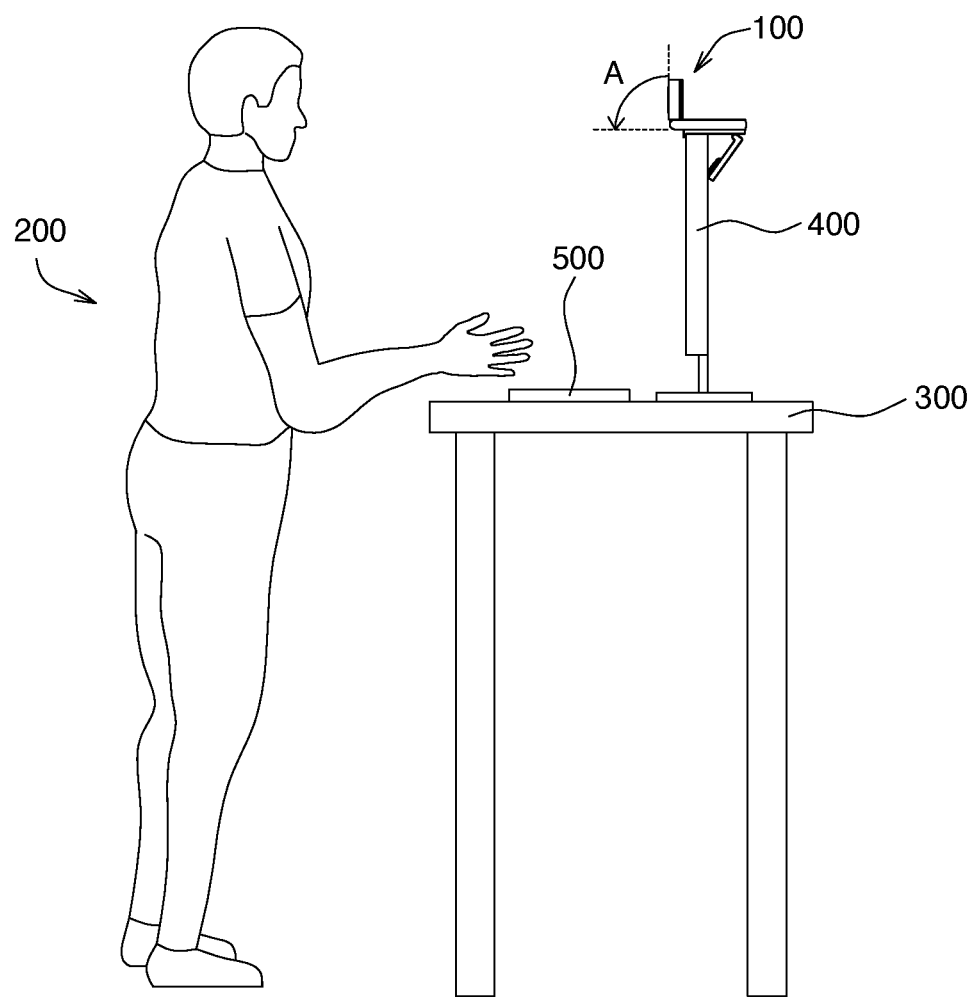
FIGS. 6A to 6D are schematic diagrams of applications of a dual purpose camera according to an embodiment.
Figure 6B:
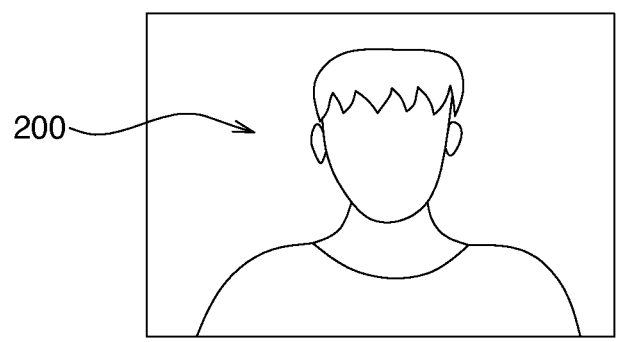
Figure 6C:
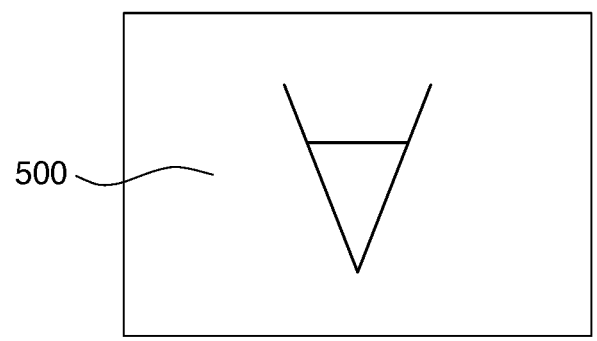
Figure 6D:
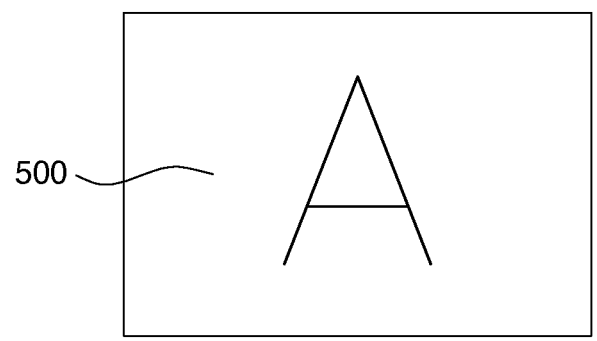

FIGS. 6A to 6D are examples of an application of a dual purpose camera 100. As indicated in FIG. 6A, under normal circumstance, the user 200 is standing in front of a desk 300, and a computer screen 400 and a document 500 are disposed on the desk 300. The dual purpose camera 100 according to an embodiment can be fixed to the computer screen 400. As indicated in FIG. 6A, when the supporting member 120 of the dual purpose camera 100 is attached to the base 110 and the camera 130 is at a first position, the dual purpose camera 100 is in a webcam mode, and the user's video image is outputted as indicated in FIG. 6B. As indicated in FIG. 6A, when the camera 130 is downwardly rotated in the direction of an arrow A to capture the image of the document 500, if no adjustment is made, the outputted image is an upside down image viewed by the camera 130 as indicated in FIG. 6C. Such an image is unfriendly to the viewers. Thus, when the dual purpose camera 100 according to an embodiment switches from the webcam mode to the doccam mode, the dual purpose camera 100 automatically outputs a 180 degree rotated image as indicated in FIG. 6D. Similarly, when the dual purpose camera 100 switches from the doccam mode to the webcam mode, the dual purpose camera 100 also automatically outputs a 180 degree rotated image.

To summarize, the present disclosure provides a dual purpose camera, which can be used as a doccam as well as a webcam. Based on mechanical situations, when the dual purpose camera of the present disclosure determines whether the doccam mode and the webcam mode have been switched, the dual purpose camera automatically rotates the image and outputs the rotated image. There is no need to perform complicated image analysis and operations, and the dual purpose camera of the present disclosure can easily integrate the doccam and the webcam.

Based on the dual purpose camera disclosed above, the present disclosure can further provide a camera mode image adjustment method. The camera mode image adjustment method of the present disclosure is used in a dual purpose camera. The camera mode image adjustment method includes: detecting whether a camera of a dual purpose camera is attached to a base; detecting whether the camera rotates from a first position to a second position; and when it is detected that the camera is attached to the base and the camera rotates from the first position to the second position, automatically outputting a 180 degree rotated image by the camera.

According to some embodiments, the camera mode image adjustment method may further include: determining the angle between the camera and a reference plane by an angle detecting module; determining whether the camera is attached to the base by a connection detecting module; determine whether the dual purpose camera is in a doccam mode or a webcam mode by a camera module according to the detection results provided by the connection detecting module and the angle detecting module; determining by the camera module that the dual purpose camera is in the webcam mode when the detection result provided by the connection detecting module indicates that the camera is attached to the base and the detection result provided by the angle detecting module indicates that the camera is at the first position; and determining by the camera module that the dual purpose camera is in the doccam mode when the detection result provided by the connection detecting module indicates that the camera is attached to the base and the detection result provided by the angle detecting module indicates that the camera is at the second position.

According to some embodiments, the camera mode image adjustment method may further includes: automatically outputting a 180 degree rotated image by the camera module when the camera module determines that the dual purpose camera switches from the webcam mode to the doccam mode or switches from the doccam mode to the webcam mode.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A dual purpose camera having a doccam mode and a webcam mode, wherein the dual purpose camera comprises:
    a base;
    a supporting member, detachably or rotatably coupled to the base; and
    a camera, rotatably or detachably coupled to the supporting member, wherein the camera rotates with respect to a reference plane of the dual purpose camera between a first position and a second position;
    wherein when it is detected that the camera is attached to the base and the camera rotates from the first position to the second position, the camera automatically outputs a 180 degree rotated image;
    wherein the camera comprises:
        a camera module, configured to capture an image, determine whether the dual purpose camera is in the doccam mode or the webcam mode, and output the image; and
        an angle detecting module, configured to communicate with the camera module and determine the angle between the camera and the reference plane; and
    wherein the camera and/or the supporting member comprises:
        a connection detecting module, configured to communicate with the camera module and determine whether the supporting member is attached to the base.

2. The dual purpose camera according to claim 1, wherein the camera module determines whether the dual purpose camera is in the doccam mode or the webcam mode according to the detection results provided by the connection detecting module and the angle detecting module;
    wherein when the detection result provided by the connection detecting module indicates that the camera is attached to the base and the detection result provided by the angle detecting module indicates that the camera is at the first position, the camera module determines that the dual purpose camera is in the webcam mode;
    wherein when the detection result provided by the connection detecting module indicates that the camera is attached to the base and the detection result provided by the angle detecting module indicates that the camera is at the second position, the camera module determines that the dual purpose camera is in the doccam mode.

3. The dual purpose camera according to claim 2, wherein when the camera module determines that the dual purpose camera switches from the webcam mode to the doccam mode or switches from the doccam mode to the webcam mode, the camera module automatically outputs a 180 degree rotated image.

4. The dual purpose camera according to claim 1, wherein the angle detecting module is a G-sensor or a tilt-sensor, and the connection detecting module is a magnetism detection module or an electrical property detection module.

5. The dual purpose camera according to claim 1, wherein at the first position, the angle between the surface of the camera on which a camera module is disposed and the reference plane is greater than 50 degree;
    wherein at the second position, the angle between the surface of the camera on which the camera module is disposed and the reference plane is less than 50 degree.

6. The dual purpose camera according to claim 1, wherein the supporting member can slide on the base along an extending direction of the supporting member and extends from the base.

7. The dual purpose camera according to claim 1, wherein the base comprises:
    a body, wherein the supporting member is attached to the body;
    a counterweight member, rotatably pivoted to the body; and
    a hinge, configured to connect the counterweight member and the body;
    wherein the dual purpose camera can be fixed to an object with the body being placed above the object and the counterweight member leaning on the rear side of the object.

8. The dual purpose camera according to claim 7, wherein the supporting member has a groove and the body has a protrusion configured to be inserted into the groove, so that the supporting member can slide on the base and extend from the base.

9. The dual purpose camera according to claim 8, wherein the supporting member has at least one magnet, the supporting member attracts the camera with a magnetic force.

10. The dual purpose camera according to claim 7, wherein the body has at least one magnet and the body attracts the supporting member with a magnetic force.

11. The dual purpose camera according to claim 1, further comprising:

a controller, configured to control the camera.

12. The dual purpose camera according to claim 11, wherein the controller is integrated on the supporting member.

13. The dual purpose camera according to claim 1, wherein the connection detecting module comprises a Hall sensor and a magnet, the Hall sensor is disposed on the camera, and the magnet is disposed on the supporting member, when the supporting member is connected to the camera and a magnetic force of the magnet of the supporting member is sensed by the Hall sensor, the connection detecting module determines that the supporting member is attached on the base; or the connection detecting module comprises a micro switch and a trigger, the micro switch is disposed on the camera, and the trigger is disposed on the supporting member, when the supporting member is connected to the camera and the trigger of the supporting member contacts the micro switch of the camera to turn on the micro switch, the connection detecting module determines that the supporting member is attached on the base; or the connection detecting module comprises an infrared sensing element and a blocking portion, the infrared sensing component is disposed on the camera, and the blocking portion is disposed on the supporting member, when the supporting member is connected to the camera and shields the infrared light of the infrared sensing element of the camera through the blocking portion of the supporting member, the connection detecting module determines that the supporting member is attached on the base.

14. A camera mode image adjustment method used in a dual purpose camera, wherein the camera mode image adjustment method comprises:

detecting whether a camera of a dual purpose camera is attached to a base;

detecting whether the camera rotates from a first position to a second position; and automatically outputting a 180 degree rotated image by the camera when it is detected that the camera is attached to the base and the camera rotates from the first position to the second position;

wherein the method further comprises:

determining the angle between the camera and a reference plane by an angle detecting module;

determining whether the camera is attached to the base by a connection detecting module;

determining whether the dual purpose camera is in a doccam mode or a webcam mode by a camera module according to the detection results provided by the connection detecting module and the angle detecting module;

determining that the dual purpose camera is in the webcam mode by the camera module when the detection result provided by the connection detecting module indicates that the camera is attached to the base and the detection result provided by the angle detecting module indicates that the camera is at the first position; and determining that the dual purpose camera is in the doccam mode by the camera module when the detection result provided by the connection detecting module indicates that the camera is attached to the base and the detection result provided by the angle detecting module indicates that the camera is at the second position.

15. The camera mode image adjustment method according to claim 14, further comprising:

automatically outputting a 180 degree rotated image by the camera module when the camera module determines that the dual purpose camera switches from the webcam mode to the doccam mode or switches from the doccam mode to the webcam mode.

* * * * *